United States Patent [19]

Juang

[11] Patent Number: 5,308,199
[45] Date of Patent: May 3, 1994

[54] DRILL BIT GUIDING DEVICE

[76] Inventor: Bor-Chang Juang, No. 3, Lane 14, Chen-Hsing Rd., Tai-Ping Hsiang, Taichung Hsien, Taiwan

[21] Appl. No.: 102,342

[22] Filed: Aug. 5, 1993

[51] Int. Cl.$^5$ ............................................. B23B 49/00
[52] U.S. Cl. ................................. 408/115 R; 408/103
[58] Field of Search ................. 408/97, 103, 115 R, 408/109, 115 B

[56] References Cited

U.S. PATENT DOCUMENTS

| | | | |
|---|---|---|---|
| 2,211,634 | 8/1940 | Baker | 408/115 R |
| 2,260,784 | 10/1941 | Morton | 408/103 |
| 2,470,038 | 5/1949 | Long | 408/115 R |
| 3,026,748 | 3/1962 | Comorau | 408/115 R |
| 4,952,101 | 8/1990 | Coombs | 408/115 R |
| 5,174,693 | 12/1992 | Lee et al. | 408/115 R |

FOREIGN PATENT DOCUMENTS 1401716  7/1975  United Kingdom ............ 408/115 R

*Primary Examiner*—Daniel W. Howell
*Attorney, Agent, or Firm*—Sughrue, Mion, Zinn, Macpeak & Seas

[57] ABSTRACT

A drill bit guiding device is used to guide axial movement of a drill bit when forming holes in a workpiece and includes an end block, a pair of guide shafts, a plurality of guide blocks and a positioning block. Each of the guide shafts is mounted removably on the end block and the positioning block in such a manner that the guide shafts are parallel to one another and extend between the end and positioning blocks. One of the guide shafts is formed with a graduated line that is marked off in units of length. The guide blocks are mounted slidably on the guide shafts and are parallel to the end block. Each of the guide blocks is formed with a single vertically extending hole in a direction that is transverse to axes of the guide shafts. The vertically extending hole receives a corresponding tubular guide sleeve therein. The guide sleeve permits extension of the drill bit thereinto. The guide blocks are locked releasably at desired positions on the guide shafts. In use, the drill bit guiding device is secured on the workpiece, and the guide blocks are positioned on the guide shafts so that the vertically extending holes are aligned with intended locations of the holes to be formed in the workpiece.

15 Claims, 10 Drawing Sheets

DRILL BIT GUIDING DEVICE

BACKGROUND OF THE INVENTION

1. Field of the Invention

The invention relates to a guiding device, more particularly to a drill bit guiding device used to guide the formation of holes in a wooden workpiece.

2. Description of the Related Art

Drill bit guiding devices are used when it is desired to form holes in a wooden workpiece accurately. Referring to FIGS. 1 and 2, a conventional drill bit guiding device 2 is used to guide the boring of holes 12 in the edge 11 of a wooden workpiece 1. The drill bit guiding device 2 includes two side plates 21, a guide block 22, a rotatable bolt 23 and a pair of guide rods 24. The side plates 21 are disposed on opposite sides of the guide block 22 and are respectively formed with aligned oppositely oriented screw holes. The rotatable bolt 23 engages the screw holes of the side plates 21 and passes through the guide block 22. The guide block 22 permits free rotation of the rotatable bolt 23. When the bolt 23 is rotated, the guide rods 24 guide movement of the side plates 21 toward or away from each other. The guide block 22 is formed with a series of aligned vertically extending holes 221. The holes 221 have different diameters and are adapted to receive a corresponding tubular guide sleeve 25 therein. The guide sleeve 25 serves to guide the axial movement of a drill bit 3 when forming a hole 12 in the edge 11 of the workpiece 1.

When using the drill bit guiding device 2, the workpiece 1 is marked on one side adjacent to the edge 11 in order to indicate the locations of the holes that are to be formed. The rotatable bolt 23 is then operated in order to adjust the distance between the side plates 21 so as to correspond with the thickness of the workpiece 1. The bottom side of the guide block 22 is seated on the edge 11 of the workpiece 1. The drill bit guiding device 2 is formed with several markings 26 which correspond respectively to the holes 221 of the guide block 22. The drill bit guiding device 2 is moved along the edge 11 until the marking 26 which corresponds to the selected hole 221 is aligned with one of the markings 101 on the workpiece The rotatable bolt 23 is further rotated until the workpiece 1 is clamped tightly between the side plate 21. The corresponding guide sleeve 25 is received in the selected hole 221, and the drill bit 3 is extended into the guide sleeve 25 and is rotated in order to bore a hole 12 in the edge 11.

After one hole 12 has been bored, the rotatable bolt 23 is operated so as to release the workpiece 1. The drill bit guiding device 2 is then moved along the edge 11 until the marking 26 which corresponds to the selected hole 221 is aligned with another one of the markings 101 on the workpiece 1. The above procedure is then repeated to form another hole 12 in the edge 11.

The drawbacks of the conventional drill bit guiding device 2 are as follows:

1. Since a relatively large distance between the side plates 21 is not permitted, the drill bit guiding device 2 cannot be used to guide the forming of holes in a relatively thick workpiece.

2. Note that the distances of the side plates 21 to the guide block 22 are equal. Therefore, when the drill bit guiding device 2 is clamped on the workpiece 1, the centers of the through holes 221 of the guide block 22 lie on a longitudinal axis of the edge 11. Thus, the holes 12 that are formed in the workpiece 1 must lie on the longitudinal axis of the edge 11 and cannot be formed on other locations.

3. Note that tolerable differences in the length, width and thickness of two equally sized workpieces 1 are usually present. With reference to FIG. 3, since the holes 12 that are formed with the use of the conventional drill bit guiding device 2 must lie on the longitudinal axes of the edges 11 of two workpieces 1, when pins 14 (only one pin 14 is shown) are used to connect the workpieces 1, a clearance (h) is formed between corresponding sides of the workpieces 1 because the thicknesses of the workpieces 1 are not exactly equal. Because both sides of the workpieces 1 are not flush, the quality of the finished product deteriorates.

4. FIG. 4 illustrates the workpiece 1 when mounted horizontally on a front side of a vertical workpiece (1a). The front side of the workpiece (1a) is formed with a number of aligned holes (12a). The axes of the holes (12a) are spaced by a fixed distance from a top surface of the workpiece (1a). As mentioned earlier, the holes 12 that are formed with the aid of the conventional drill bit guiding device 2 lie on the longitudinal axis of the edge 11 of the workpiece 1. If the thickness of the workpiece 1 deviates from an ideal value, a clearance (h) is formed between the top surface of the workpiece (1a) and one side of the workpiece 1 when pins 14 (only one pin 14 is shown) are used to connect the workpieces 1, (1a). Because the desired surfaces of the workpieces 1, (1a) are not flush, the quality of the finished product deteriorates.

Referring to FIGS. 5 and 6, a second conventional drill bit guiding device 4 is used to guide the boring of holes 12 in a wide surface 13 of a wooden workpiece 1. The drill bit guiding device 4 includes a pair of parallel shafts 41 and a pair of elongated guide bars 42. The guide bars 42 are respectively formed with a series of aligned and equally spaced vertically extending holes 421. The holes 42 are equally sized and are adapted to receive a tubular guide sleeve 422 therein. The guide sleeve 422 serves to guide the axial movement of a drill bit 3 when forming a hole 12 in the surface 13 of the workpiece 1. The guide bars 42 are mounted slidably and transversely on the parallel shafts 41. The drill bit guiding device 4 further includes knobs 43 which are operable so as to lock the guide bars 42 on the parallel shafts 41. A limit piece 44 is provided on each end of the parallel shafts 41. Each of the parallel shafts 41 has a threaded end portion 411. Nuts 412 engage the threaded end portion 411 of the respective parallel shaft 41 and are tightened so as to urge the limit pieces 44 to clamp tightly the edges of the workpiece 1, thereby mounting the drill bit guiding device 4 on the workpiece 1.

When using the conventional drill bit guiding device 4, the guide bars 42 are initially adjusted to the desired positions on the workpiece 1. A guide plate 45, which is mounted detachably and slidably on one of the guide bars 42, is moved along said one of the guide bars 42 so as to align with a selected one of the holes 421. The guide sleeve 422 is received in the selected hole 421, and the drill bit 3 is extended into the guide sleeve 422 and is rotated in order to bore a hole 12.

After one hole 12 has been bored, the guide sleeve 422 is removed, and the guide plate 45 is moved so as to align with another one of the holes 421. The above procedure is then repeated to form another hole 12 in the workpiece 1.

The drawbacks of the conventional drill bit guiding device 4 are as follows:

1. The drill bit guiding device 4 is adapted for use when forming holes 12 in a relatively wide surface 13 of a workpiece 1 and cannot be used when forming holes in an edge of a relatively thin workpiece.

2. Note that the distance between adjacent holes 421 in the guide bars 42 is fixed. If the distance between the adjacent holes 421 is one inch, the permissible distance between the holes 12 in the workpiece 1 is limited to an integral multiple of one, such as one inch, two inches, etc. A distance of 1.5 inches between the holes 12 is not permitted.

3. Each time the drill bit guiding device 4 is used to guide the boring of a hole 12 in the workpiece 1, the guide plate 45 should be moved to a desired position before the guide sleeve 422 can be received in the selected hole 421. The guide sleeve 422 is removed before the guide plate 45 can be moved to another desired position on the workpiece 1 when boring another hole 12 in the workpiece

SUMMARY OF THE INVENTION

Therefore, the objective of the present invention is to provide a drill bit guiding device which can overcome the drawbacks commonly associated with the prior art.

More specifically, the objective of the present invention is to provide a drill bit guiding device which can be used to guide the forming of holes in desired locations of the edges or the relatively wide surfaces of a wooden workpiece.

Accordingly, the drill bit guiding device of the present invention is used to guide axial movement of a drill bit when forming holes in a workpiece and includes an end block, a pair of guide shafts, a plurality of guide blocks and a positioning block. Each of the guide shafts is mounted removably on the end block and the positioning block in such a manner that the guide shafts are parallel to one another and extend between the end and positioning blocks. One of the guide shafts is formed with a graduated line that is marked off in units of length. The guide blocks are mounted slidably on the guide shafts and are parallel to the end block. Each of the guide blocks is formed with a single vertically extending hole in a direction that is transverse to axes of the guide shafts. The vertically extending hole receives a corresponding tubular guide sleeve therein. The guide sleeve permits extension of the drill bit thereinto. The guide blocks are locked releasably at desired positions on the guide shafts. In use, the drill bit guiding device is secured on the workpiece, and the guide blocks are positioned on the guide shafts so that the vertically extending holes are aligned with intended locations of the holes to be formed in the workpiece.

In one embodiment of the present invention, the drill bit guiding device is used with a position adjusting device which facilitates adjustments in the position of the former along X and Y axes of the workpiece.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
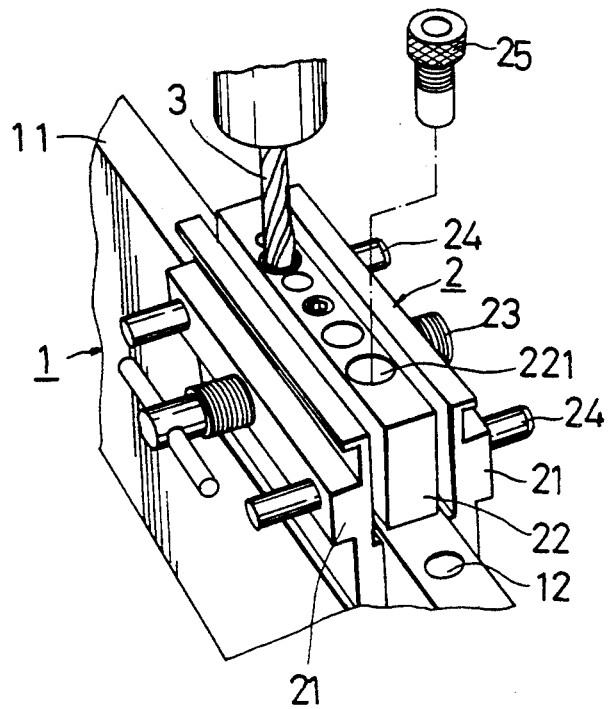
FIG. 1 is a perspective view of a first example of a conventional drill bit guiding device when secured on the edge of a wooden workpiece.

Before the present invention is described in greater detail, it should be noted that like elements are denoted by the same reference numerals throughout the disclosure.

Figure 7:
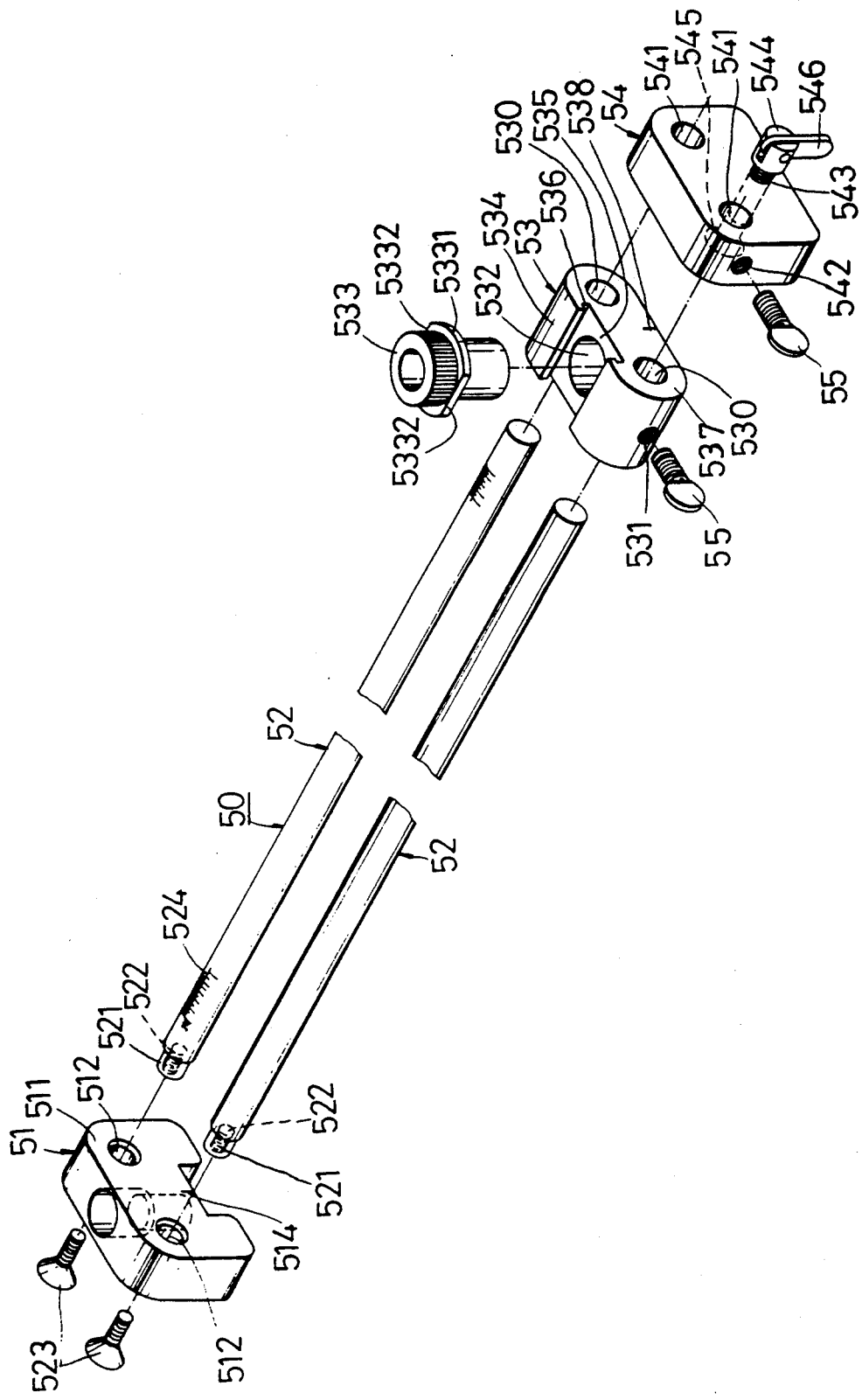
FIG. 7 is an exploded perspective view of the first preferred embodiment of a drill bit guiding device according to the present invention.
Figure 8:
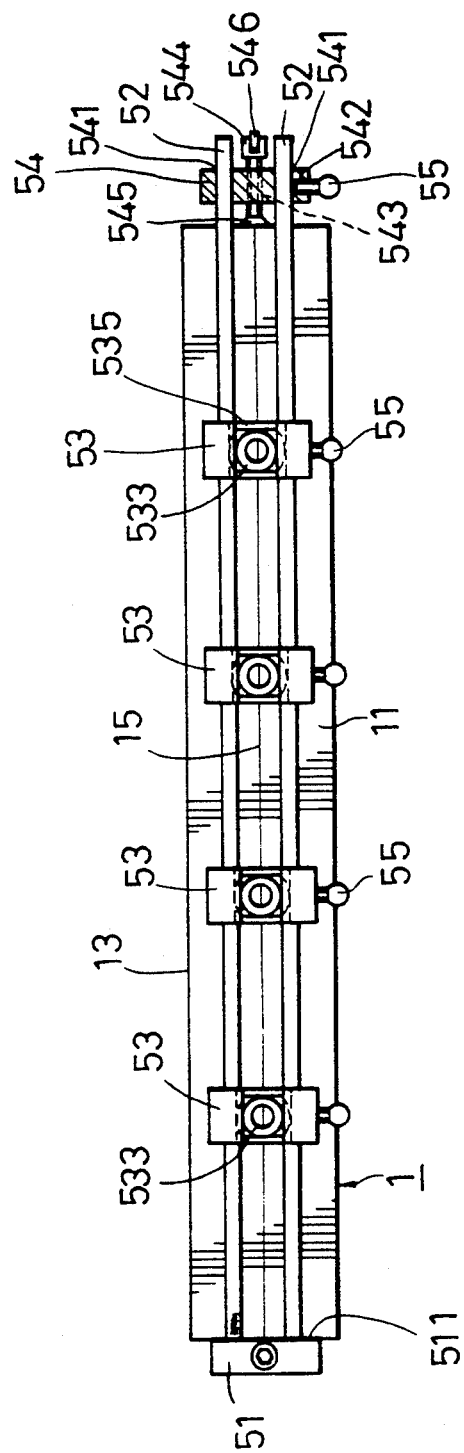
FIG. 8 is a top view illustrating the first preferred embodiment when used to guide the forming of holes in an edge of a workpiece.

Referring to FIGS. 7 and 8, the first preferred embodiment of a drill bit guiding device 50 according to the present invention is shown to comprise an end block 51, a pair of parallel guide shafts 52, a plurality of guide blocks 53 and a positioning block 54.

The end block 51 is a rectangular block which has an end face 511 that is formed with a spaced pair of through bores 512. The end block 51 is provided with a mark 514 at a location that is midway of the through bores 512.

In this embodiment, the guide shafts 52 are cylindrical shafts and are preferably about 24 inches long. Each of the guide shafts 52 has a restricted distal end portion 521 which is formed with an internally threaded screw hole 522. The through bores 512 conform with the shape of the distal end portion 521 of a corresponding guide shaft 52 and receive the same therein. Countersunk-head bolts 523 engage the screw hole 522 of the corresponding guide shaft 52 in order to secure the guide shafts 52 removably to the end block 51. When secured to the end block 51, the guide shafts 52 are parallel to one another and extend horizontally from the end face 511 of the end block 51. One of the guide shafts 52 is formed with a graduated line 524 which is marked off in units of length, such as in inches or centimeters.

The number of guide blocks 53 to be installed should be equal to the number of holes 12 to be formed in a workpiece 1. Each of the guide blocks 53 is formed with a pair of parallel horizontal through holes 530 which respectively permit the passage of the guide shafts 52 therethrough. Each of the guide blocks 53 is further formed with a screw hole 531 that is communicated with a corresponding through hole 530 and that is transverse to the axis of the corresponding through hole 530. Wing bolts 55 engage the screw hole 531 of the guide blocks 53 in order to lock the guide blocks 53 at desired positions on the guide shafts 52. Each of the guide blocks 53 is formed with a vertically extending hole 532 that passes through a center of the same and that receives a tubular guide sleeve 533 therein. Each of the guide blocks 53 further has a top surface 534 which is formed with an indentation 535. Each of two opposing side walls which confine the indentation 53 is formed with a notch 536 that is accessible via the indentation 535. The guide sleeve 533 has a top end which is formed with a radial outward flange 5331 The flange 5331 has an opposite pair of straight edges 5332. The distance between the straight edges 5332 is equal to the width of the indentation 535. Thus, when the guide sleeve 533 is rotated, portions of the flange 5331 extend into the notches 536, thereby preventing the untimely removal of the guide sleeve 533 from the guide block 53. Each of the guide blocks 53 is parallel to the end block 51 and has an end face 537 which is provided with a mark 538.

The dimensions of the positioning block 54 are substantially similar to those of the end block 51. The positioning block 54 is formed with a pair of through holes 541 that are aligned with the through bores 512 of the end block 51 The diameter of the through holes 541 is similar to that of the through holes 530 of the guide blocks 53. The positioning block 54 is formed with a screw hole 542 that is communicated with a corresponding through hole 541 and that is transverse to the axis of the corresponding through hole 541. A wing bolt 55 engages the screw hole 542 in order to lock the positioning block 54 on the guide shafts 52. The lower portion of the positioning block 54 is formed with a screw hole 543 at a location that is midway of the through holes 541. An operating screw 544 engages the screw hole 543 and has a distal end which is provided with a movable jaw 545. The operating screw 544 further has a head portion with a handle 546 mounted pivotally thereon.

Figure 2:
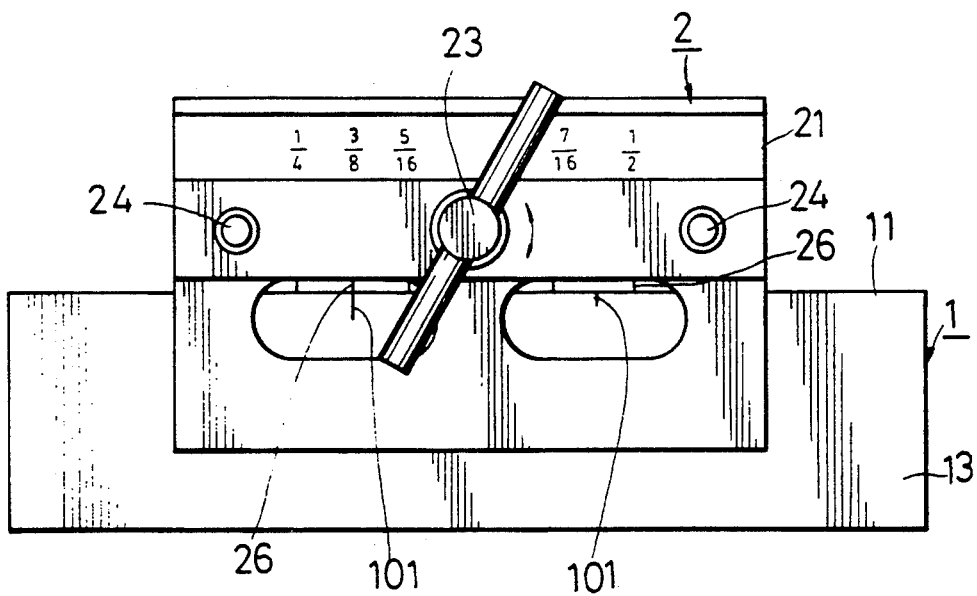
FIG. 2 is a schematic view of the drill bit guiding device shown in FIG. 1.
Figure 4:
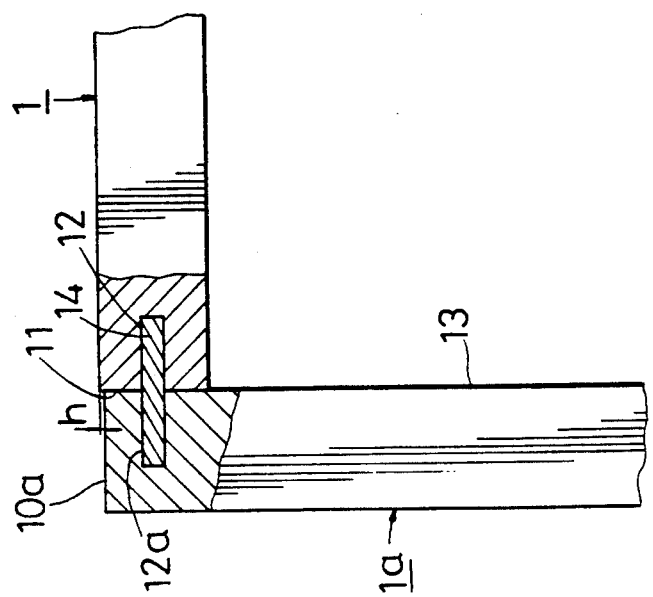
FIG. 4 illustrates a workpiece which was bored with holes with the aid of the drill bit guiding device shown in FIG. 1 when mounted horizontally on a vertical workpiece.
Figure 3:
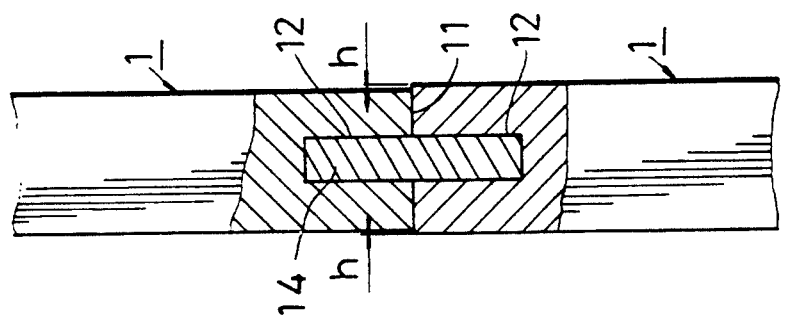
FIG. 3 illustrates two interconnected workpieces which were bored with holes with the aid of the drill bit guiding device shown in FIG. 1.
Figure 5:
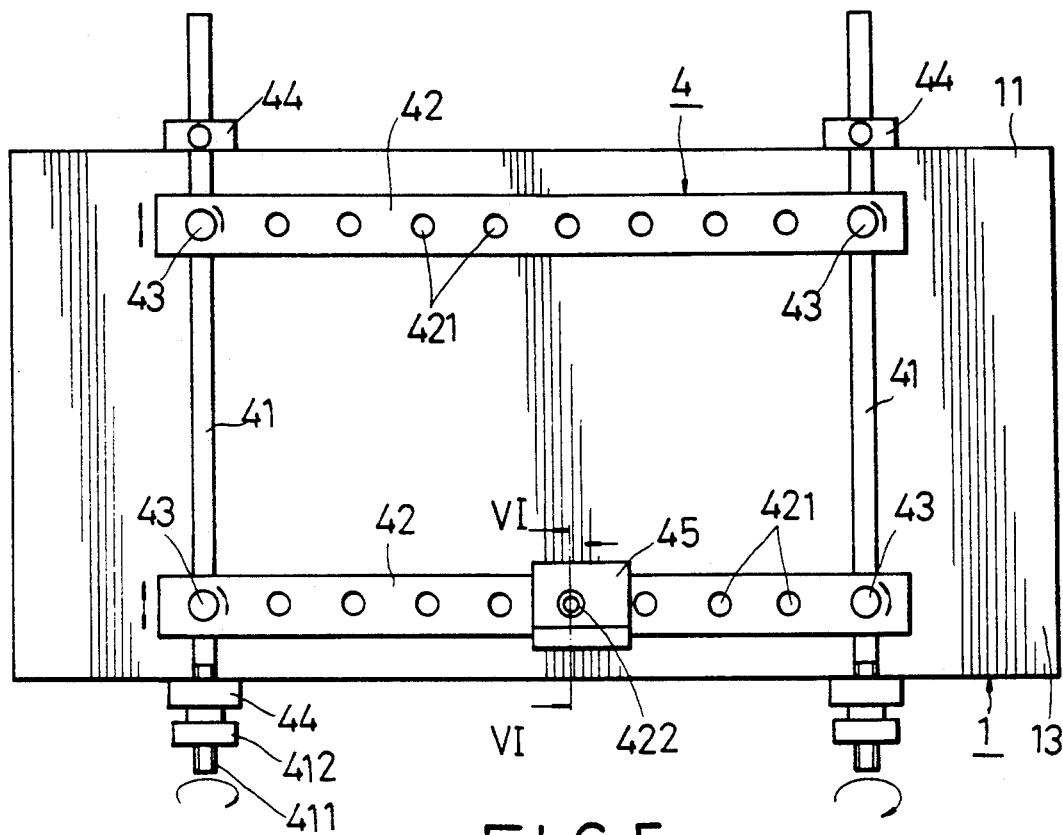
FIG. 5 is a top view illustrating a second example of a conventional drill bit guiding device that is used to guide the formation of holes in a relatively wide surface of a wooden workpiece.
Figure 6:
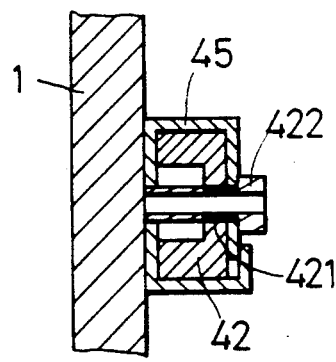
FIG. 6 is a sectional view of FIG. 5 taken along line VI—VI.

The following is a detailed description of the operation of the first preferred embodiment:

Referring to FIG. 8, before the first preferred embodiment can be used, a line 15 is initially drawn on the edge 11 of the workpiece 1, which line 15 passes through the centers of a series of holes that are to be formed in the edge 11. The line 15 is spaced from a reference surface 13 of the workpiece 1 by a predetermined distance and does not necessarily lie on a longitudinal axis of the edge 11. Therefore, when the first preferred embodiment is used to guide the forming of holes in the edges of two workpieces with different thicknesses, corresponding sides of the workpieces can be flushed. The drill bit guiding device 50 can thus overcome the drawbacks which are commonly encountered when the conventional drill bit guiding device 2 of FIGS. 1 and 2 is employed.

In use, the number of holes to be formed in the edge 11 of the workpiece 1 is determined in order to determine the number of guide blocks 53 to be installed on the guide shafts 52. With the aid of the graduated line 524, the guide blocks 53 are moved along the guide shafts 52 so as to position the same properly thereon. Afterwards, the wing bolts 55 are operated in order to lock the guide blocks 53 at the desired positions on the guide shafts 52. To mount the first preferred embodiment on the workpiece 1, the end face 511 of the end block 51 abuts against one side of the workpiece 1 and is positioned so that the mark 514 thereon is aligned with the line 15. The mark 538 on each of the guide blocks 53 is similarly aligned with the line 15. The positioning block 54 is moved toward the end block 51 until the former abuts with an opposite side of the workpiece 1. The wing bolts 55 are then tightened t o secure the positioning block 54 on the guide shafts 52. In order to mount the first preferred embodiment securely on the workpiece 1, the operating screw 544 is rotated so that the movable jaw 545 abuts tightly against the workpiece 1. The guide sleeves 533 are then received in the hole 532 of the respective guide block 53. A drill bit (not shown) is extended into each of the guide sleeves 533 and is rotated in order to bore a series of holes in the edge 11 of the workpiece 1.

Figure 9:
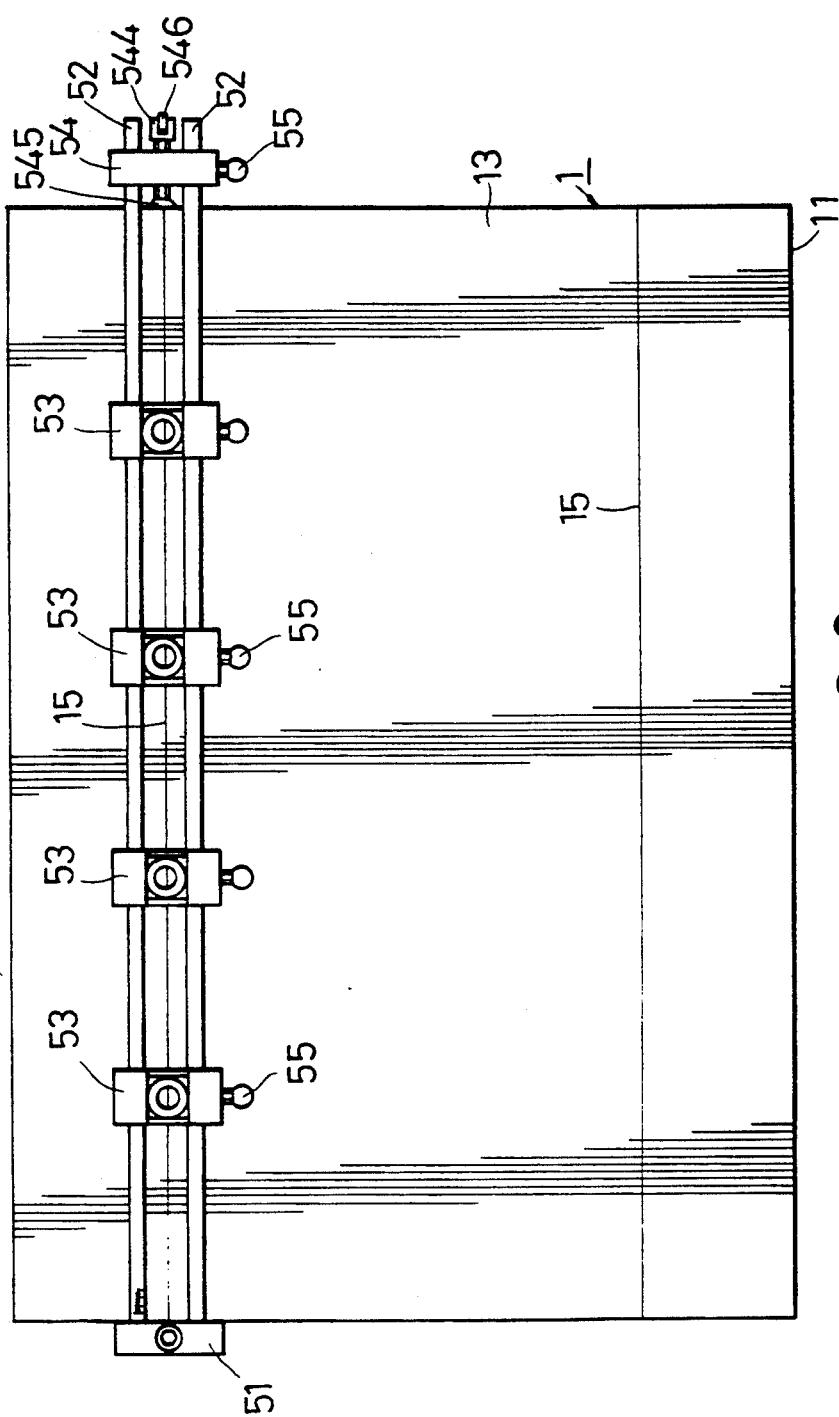
FIG. 9 is a top view illustrating the first preferred embodiment when used to guide the forming of holes in a relatively wide surface of a workpiece.

FIG. 9 illustrates the first preferred embodiment when used to form a series of holes in a wide surface 13 of the workpiece 1. As with the previously described operation, a line 15 must be drawn initially on the wide surface 13 of the workpiece 1 before the first preferred embodiment can be used, which line 15 passes through the centers of a series of holes to be formed in the wide surface 13. The installation and operation of the first preferred embodiment is similar to the previously described operation and will not be detailed further.

Figure 10:
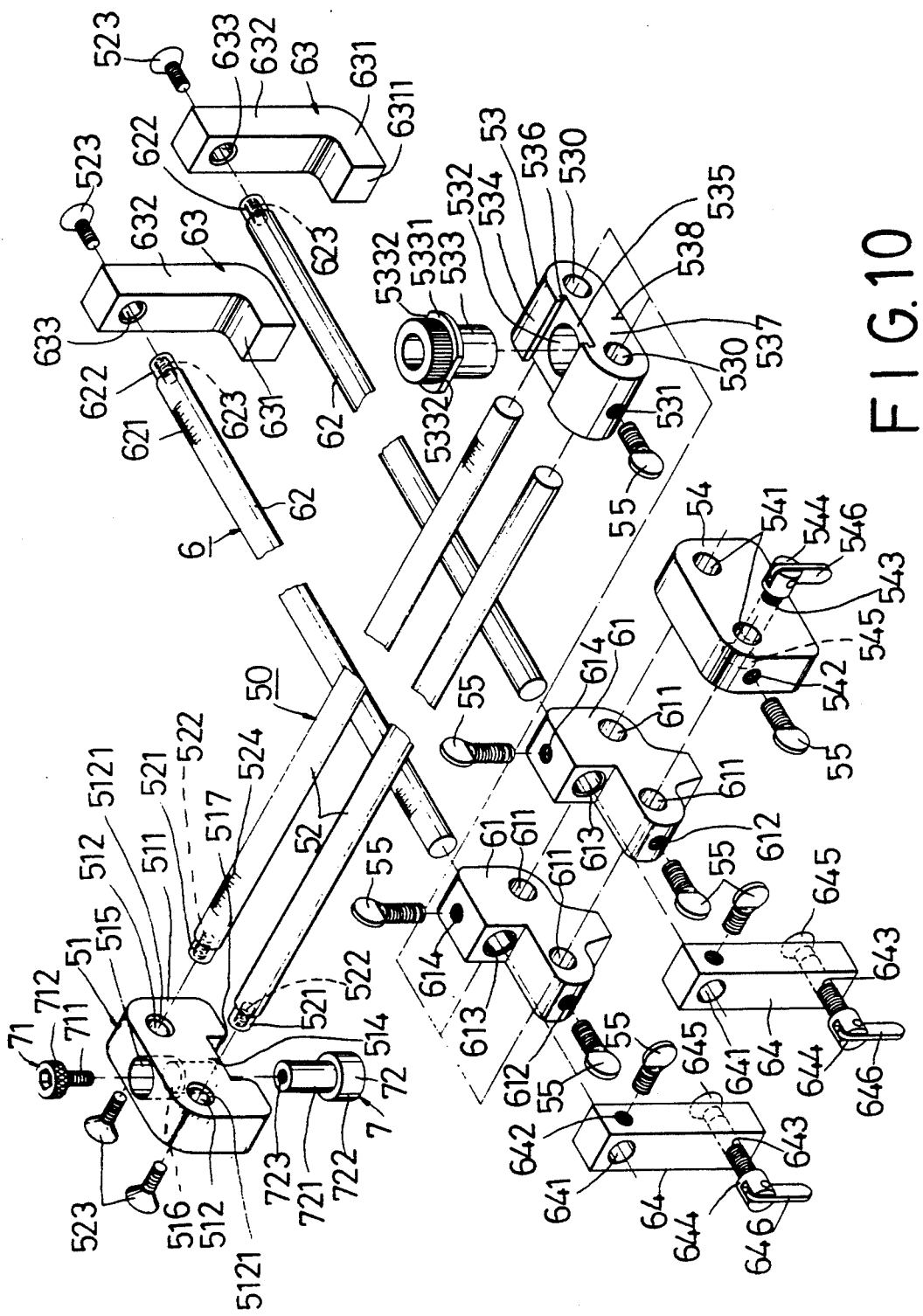
FIG. 10 is an exploded perspective view of the second preferred embodiment of a drill bit guiding device according to the present invention.
Figure 11:
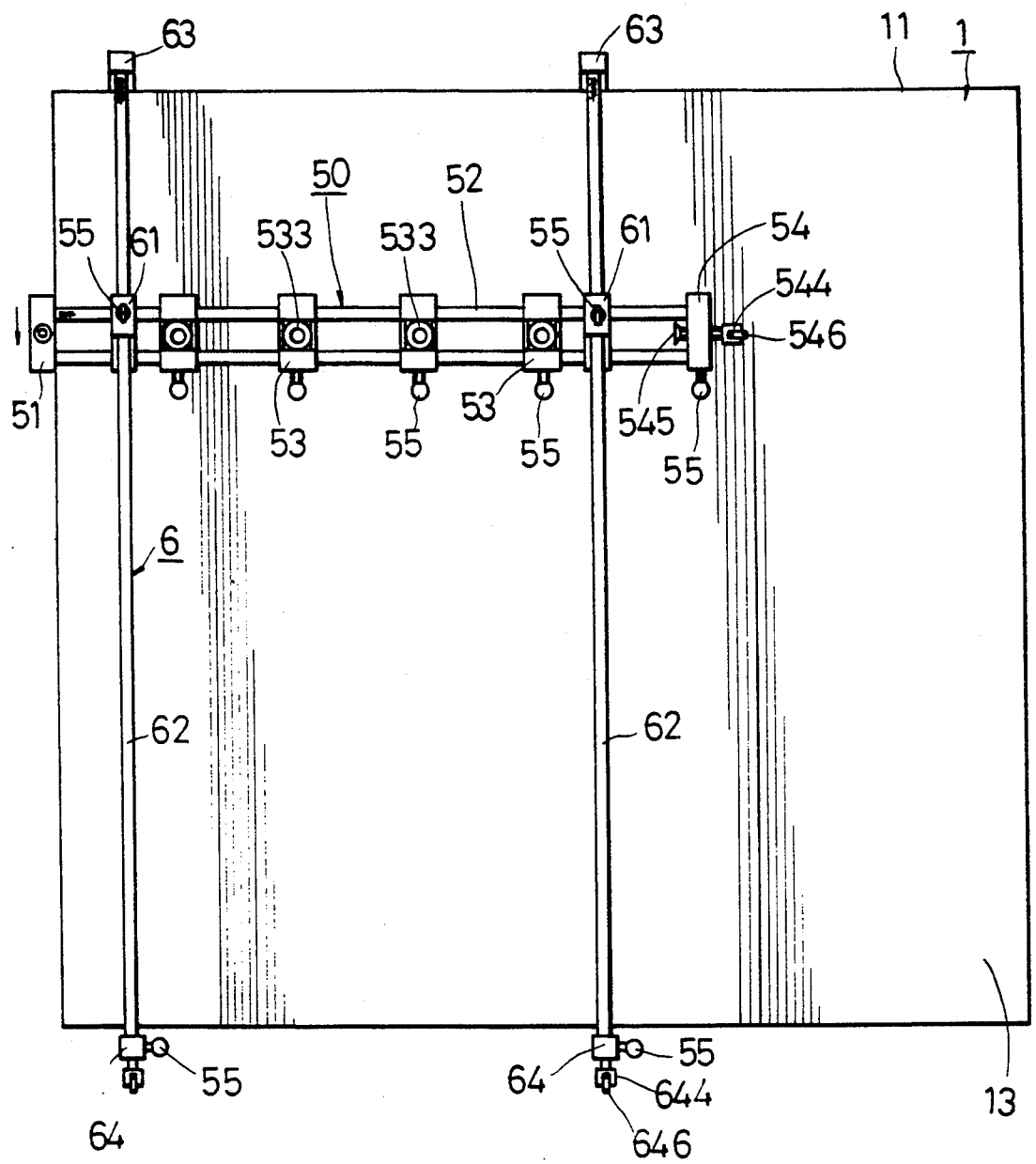
FIG. 11 is a top view illustrating the second preferred embodiment when in use.

FIGS. 10 and 11 illustrate the second preferred embodiment of a drill bit guiding device according to the present invention. The second preferred embodiment comprises the drill bit guiding device 50 of the first preferred embodiment and a position adjusting device 6. The position adjusting device 6 is operable so as to adjust the position of the drill bit guiding device 50 along the X and Y axes of a workpiece 1 and includes two connecting blocks 61, two slide bars 62, two elongated end pieces 63, and two elongated positioning pieces 64.

The thickness of each connecting block 61 is equal to those of the end block 51 and the positioning block 54. The connecting blocks 61, however, are slightly wider than the end block 51 and the positioning block 54. Each of the connecting blocks 61 is formed with a pair of first through holes 611 which are aligned and similar in size with the through holes 541 of the positioning block 54. The first through holes 611 permit the passage of a respective one of the guide shafts 52 therethrough. Each of the connecting blocks 61 is further formed with a screw hole 612 that is communicated with one of the first through holes 611 and that is transverse to the axis of said one of the first through holes 611. Wing bolts 55 engage the screw holes 612 of the connecting blocks 61 in order to lock the latter at desired positions on the guide shafts 52. Each of the connecting blocks 61 further has a raised portion which is formed with a second through hole 613 that has a diameter equal to those of the first through holes 611. The axis of the second through hole 613 is transverse to those of the first through holes 611. The raised portion of each connecting block 61 has a top face which is formed with a screw hole 614 that is communicated with the second through hole 613 and that is transverse to the axis of the second through hole 613. A wing bolt 55 engages the screw hole 614.

The slide bars 62 are cylindrical shafts which are similar to the guide shafts 52 in diameter and which are preferably 36 inches long. The slide bars 62 are thus 12 inches longer than the guide shafts 52. One of the slide bars 62 is formed with a graduated line 621 which is marked off in units of length, such as in inches or centimeters. Each of the slide bars 62 has a restricted distal end portion 622 which is similar to the distal end portion 521 of the guide shafts 52 and which is also formed with an internally threaded screw hole 623 It has thus been shown that the slide bars 62 and the guide shafts 52 are substantially the same, except for differences in the lengths thereof. The slide bars 62 and the guide shafts 52 are thus interchangeable.

Each of the elongated end pieces 63 has a substantially L-shaped vertical cross section with a vertical portion 632 and a horizontal lower portion 631. The horizontal lower portion 631 has an end face 6311 which abuts against one edge of the workpiece 1 when the second preferred embodiment is in use. The vertical portion 632 is formed with a through bore 633 adjacent to a top end of the same. The through bore 633 conforms with the shape of the distal end portion 622 of a corresponding slide bar 62 and receives the same therein. Countersunk-head bolts 523 engage the screw hole 623 of the corresponding slide bar 62 in order to mount the slide bars 62 removably on the respective end piece 63.

Each of the elongated positioning pieces 64 is an upright rectangular piece which is formed with a through hole 641 that is adjacent to a top end thereof so as to permit the passage of one end of a corresponding slide bar 62 therethrough. The positioning pieces 64 are aligned with the end pieces 63 and are respectively formed with a screw hole 642 that is communicated with the through hole 641 and that is transverse to the axis of the through hole 641. Wing bolts 55 engage the screw holes 642 of the positioning pieces 64 in order to lock the positioning pieces 64 on the slide bars 62. Each of the positioning pieces 64 further has a lower portion which is formed with a screw hole 643. Operating screws 644 engage the respective screw hole 643 and respectively have a distal end which is provided with a movable jaw 645. Each of the operating screws 644 further has a head portion with a handle 546 mounted pivotally thereon. The operating screws 644 are rotated so that the movable jaws 645 and the end faces 6311 of the end pieces 63 abut tightly against the workpiece 1 when the second preferred embodiment is mounted on the latter.

Figure 13:
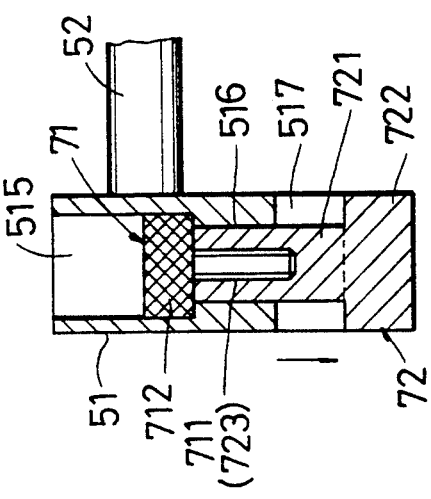
FIG. 13 is a sectional view of an end block shown in FIG. 12.

Note that the connecting blocks 61 are taller than the end block 51. Therefore, some means must be provided in order to adjust the height of the end block 51 so as to correspond with the height of the connecting blocks 61 and so as to ensure that proper contact between the end block 51 and the workpiece 1 is maintained. In this embodiment, the top surface of the end block 51 is formed with a counterbore at a midsection thereof. The counterbore includes a wide upper portion 515 and a narrow lower portion 516. The end block 51 is further formed with a notch 517 which opens from a bottom face thereof and which is disposed between the through holes 512. The lower portion 516 of the counterbore is communicated with the notch 517. A contact unit 7 is provided in the counterbore and includes a screw member 71 and a pedestal member 72. The screw member 71 has a threaded shank portion 711 and an enlarged head portion 712. The pedestal member 72 has an upright shaft portion 721 and an enlarged circular base portion 722. The upright shaft portion 721 has a diameter which corresponds to that of the lower portion 516 of the counterbore and is received slidably therein. The diameter of the circular base portion 722 corresponds to the width of the notch 517. The top end of the upright shaft portion 721 is formed with an internally threaded blind hole 723 which engages threadedly the shank portion 711 of the screw member 71. The head portion 712 of the screw member 71 is received in the upper portion 515 of the counterbore and rests normally on an annular shoulder which is formed at the junction of the upper and lower portions 515, 516 of the counterbore. When no upward force is applied on the pedestal member 72, the pedestal member 72 moves downward so that the height of the end block 51 corresponds to that of the end pieces 63, as shown in FIG. 13.

Figure 12:
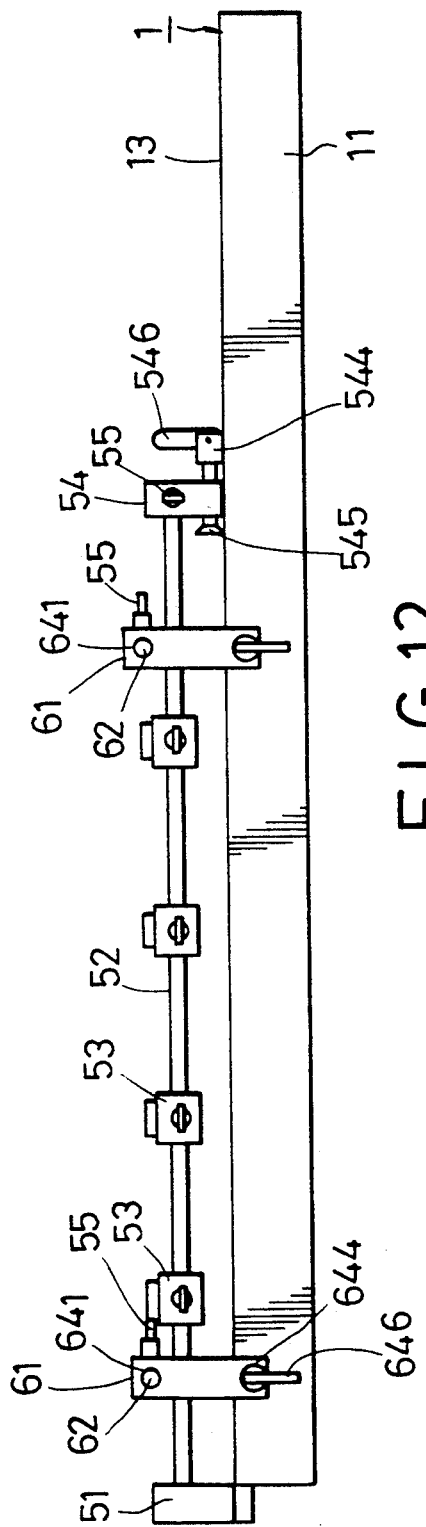
FIG. 12 is a schematic view of the second preferred embodiment when in use.

The following is a detailed description of the operation of the second preferred embodiment:

Referring to FIGS. 11 and 12, the drill bit guiding device 50 and the position adjusting device 6 are transverse to one another when the second preferred embodiment is mounted on the workpiece 1. The connecting blocks 61 permit adjustments in the position of the drill bit guiding device 50 along a Y-axis of the workpiece 1. Furthermore, since the connecting blocks 61 are taller than the end block 51, it is possible that the end face 511 of the end block 51 does not contact a corresponding edge of the workpiece 1. In this embodiment, the length of the contact unit 7 has been chosen in order to enable the circular base portion 722 of the pedestal member 72 to contact the corresponding edge of the workpiece 1. The end faces 6311 of the elongated end pieces 63 abut against another edge of the workpiece 1. The elongated positioning pieces 64 are then moved toward the end pieces 63 until the former abut with an opposite edge of the workpiece 1. The wing bolts 55 are tightened to secure the positioning pieces 64 on the slide bars 62. Afterwards, the operating screws 644 are rotated so that the movable jaws 645 abut tightly against the workpiece 1. The position adjusting device 6 is mounted securely on the workpiece 1 at this stage.

In use, the guide blocks 53 have been initially locked at the desired positions on the guide shafts 52. Furthermore, the drill bit guiding device 50 has been previously adjusted to the location on the workpiece 1 where holes are to be formed. Regardless of whether the drill bit guiding device 50 is longer or shorter than the length of the workpiece 1 along the X-axis of the same, there is no need to secure the positioning block 54 on the edge of the workpiece 1 opposite to the end block 51. Whether or not the positioning block 54 is secured is unimportant as long as the position adjusting device 6 has been properly secured on the workpiece 1 and the end block 51 is properly disposed on the corresponding edge of the workpiece 1.

After a first series of holes has been formed on the workpiece 1, the wing bolts 55 which engage the screw holes 614 of the connecting blocks 61 are released and, with the aid of the graduated line 621, the drill bit guiding device 50 is slid along the slide bars 62 so as to position the latter on another location on the workpiece 1 where a second series of holes is to be formed The graduated line 621 eliminates the need for drawing a reference line on the surface of the workpiece 1 before a hole drilling operation can be initiated. Furthermore, since the drill bit guiding device 50 is mounted slidably on the slide bars 62, adjustments in the position of the former relative to the workpiece can be easily achieved, thus facilitating the performance of a high precision drilling operation.

Figure 14:
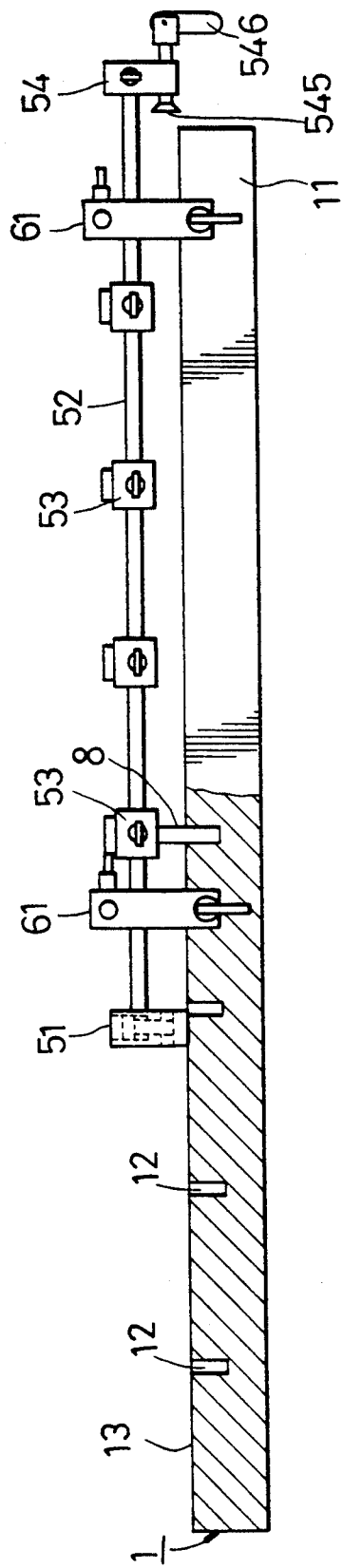
FIG. 14 is another schematic view illustrating the second preferred embodiment when in use.

If the length of the workpiece 1 along the X-axis is very long, it would be impossible to drill a series of holes in a single drill bit guiding operation. If this is the case, the position adjusting device 6 is released from the workpiece 1 and is shifted to another portion of the latter where the drilling operation has yet to be performed, as shown in FIG. 14. The drill bit guiding device 50 is then positioned so that the hole 532 of a first one of the guide blocks 53 is aligned with one of the holes 12 formed previously in the workpiece 1. A pin 8 extends into the aligned holes 532, 12 to serve as a reference point for the succeeding drilling operation. This ensures that the holes which are to be formed are properly aligned with the previously formed holes 12.

It has thus been shown that the drill bit guiding device of the present invention is simple in construction, is easy to use, and can help provide a high drilling precision. Furthermore, the present invention can be used regardless of the size of the surface to be drilled.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A drill bit guiding device for guiding axial movement of a drill bit when forming holes in a workpiece, comprising:
    an end block having an end face which is formed with a spaced pair of horizontally aligned through bores;
    a pair of guide shafts, each having a first end portion extending into a respective one of said through bores of said end block and being mounted removably on said end block in such a manner that said guide shafts are parallel to one another and extend horizontally from said end face of said end block, one of said guide shafts being formed with a graduated line that is marked off in units of length, each of said guide shafts further having a second end portion;
    a plurality of guide blocks mounted slidably on said guide shafts and parallel to said end block, each of said guide blocks being formed with a single vertically extending hole in a direction that is transverse to axes of said guide shafts, said vertically extending hole receiving a corresponding tubular guide sleeve therein, said guide sleeve permitting extension of the drill bit thereinto, said guide blocks being locked releasably at desired positions on said guide shafts; and
    a positioning block mounted slidably on said second end portions of said guide shafts;
    whereby, said end block and said positioning block clamp opposite sides of said workpiece, and said guide blocks are positioned on said guide shafts so that said vertically extending holes are aligned with intended locations of the holes to be formed in the workpiece when said drill bit guiding device is in use.

2. The drill bit guiding device as claimed in claim 1, wherein said first end portion of each of said guide shafts is a restricted end portion that is formed with an internally threaded screw hole, said through bores of said end block conforming with a shape of said first end portion of said guide shafts, said drill bit guiding device further comprising bolts which engage said screw holes of said guide shafts to mount removably said guide shafts on said end block.

3. The drill bit guiding device as claimed in claim 1, wherein each of said guide blocks is formed with a pair of parallel horizontal through holes which respectively permit said guide shafts to pass slidably therethrough, and a screw hole that is communicated with a corresponding one of said through holes of said guide block and that is transverse to an axis of said corresponding one of said through holes, said drill bit guiding device further comprising bolts which engage said screw hole of said guide blocks to lock releasably said guide blocks at the desired positions on said guide shafts.

4. The drill bit guiding device as claimed in claim 1, wherein said positioning block is formed with a pair of through holes which respectively permit said second end portions of said guide shafts to pass slidably therethrough, and a first screw hole that is communicated with a corresponding one of said through holes of said positioning block and that is transverse to an axis of said corresponding one of said through holes, said drill bit guiding device further comprising a bolt which engages said first screw hole to mount releasably said positioning block on said guide shafts.

5. The drill bit guiding device as claimed in claim 4, wherein said positioning block has a lower portion which is formed with a second screw hole at a location that is midway of said through holes thereof, said drill bit guiding device further comprising an operating screw which engages said second screw hole and which has a distal end that is provided with a movable jaw, said operating screw further having a head portion with a handle mounted pivotally thereon, said operating screw being rotated to enable said movable jaw to abut tightly against one of the opposite sides of said workpiece.

6. The drill bit guiding device as claimed in claim 1, wherein:
    each of said guide blocks has a top surface which is formed with an indentation, each of two opposing side walls which confine said indentation being formed with a notch that is accessible via said indentation; and
    each said corresponding guide sleeve has a top end which is formed with a radial outward flange, said flange having an opposite pair of straight edges, said straight edges being spaced by a distance equal to a width of said indentation;
    whereby, said flange is received in said indentation and said guide sleeve is rotated until portions of said flange extend into said notches.

7. A drill bit guiding device for guiding axial movement of a drill bit when forming holes in a workpiece, comprising:
    an end block having an end face which is formed with a spaced pair of horizontally aligned through bores;
    a pair of guide shafts, each having a first end portion extending into a respective one of said through bores of said end block and being mounted removably on said end block in such a manner that said guide shafts are parallel to one another and extend horizontally from said end face of said end block, one of said guide shafts being formed with a graduated line that is marked off in units of length, each of said guide shafts further having a second end portion;

a plurality of guide blocks mounted slidably on said guide shafts and parallel to said end block, each of said guide blocks being formed with a single vertically extending hole in a direction that is transverse to axes of said guide shafts, said vertically extending hole receiving a corresponding tubular guide sleeve therein, said guide sleeve permitting extension of the drill bit thereinto, said guide blocks being locked releasably at desired positions on said guide shafts;

a positioning block mounted slidably on said second end portions of said guide shafts;

a pair of connecting blocks, each of which being formed with a pair of first through holes that permit a respective one of said guide shafts to pass slidably therethrough, and a second through hole that is disposed above said first through holes and that has an axis transverse to those of said first through holes, said connecting blocks being locked releasably at desired positions on said guide shafts;

a pair of slide bars transverse to said guide shafts, each of said slide bars having first and second end portions and passing slidably through said second through hole of a respective one of said connecting blocks, said connecting blocks being locked releasably at desired positions on said slide bars, one of said slide bars being formed with a graduated line which is marked off in units of length;

a pair of elongated end pieces, each having a substantially L-shaped vertical cross section with a vertical portion and a horizontal lower portion, said horizontal lower portion having an end face, said vertical portion being formed with a through bore, said first end portion of said slide bars extending respectively into said through bores of said end pieces and being mounted removably on said end pieces; and a pair of upright elongated positioning pieces, each of which being formed with a through hole to permit said second end portion of a respective one of said slide bars to extend slidably therethrough, said positioning pieces being mounted releasably on said slide bars;

whereby, said end faces of said end pieces and said positioning pieces clamp opposite sides of said workpiece, said connecting blocks permit adjustment of said guide shafts along said slide bars, said guide blocks being positioned on said guide shafts so that said vertically extending holes are aligned with intended locations of the holes to be formed in the workpiece when said drill bit guiding device is in use.

8. The drill bit guiding device as claimed in claim 7, wherein said slide bars and said guide shafts are similar in diameter and differ in length, said slide bars and said guide shafts being interchangeable.

9. The drill bit guiding device as claimed in claim 7, wherein each of said connecting blocks is formed with first and second screw holes that are respectively communicated with one of said first through holes and said second through hole and that are respectively transverse to said one of said first through holes and said second through hole, said drill bit guiding device further comprising bolts which engage said first and second screw holes to lock releasably said connecting blocks at the desired positions on said guide shafts and said slide bars.

10. The drill bit guiding device as claimed in claim 7, wherein each of said positioning pieces further has a first screw hole that is communicated with said through hole of said positioning piece and that is transverse to an axis of said through hole, said drill bit guiding device further comprising bolts which engage said first screw hole of said positioning pieces to mount releasably said positioning pieces on said slide bars.

11. The drill bit guiding device as claimed in claim 10, wherein each of said positioning pieces has a lower portion which is formed with a second screw hole, said drill bit guiding device further comprising an operating screw which engages said second screw hole and which has a distal end that is provided with a movable jaw, said operating screw further having a head portion with a handle mounted pivotally thereon, said operating screw being rotated to enable said movable jaw to abut tightly against one of the opposite sides of said workpiece.

12. The drill bit guiding device as claimed in claim 7, wherein:

each of said guide blocks has a top surface which is formed with an indentation, each of two opposing side walls which confine said indentation being formed with a notch that is accessible via said indentation; and each said corresponding guide sleeve has a top end which is formed with a radial outward flange, said flange having an opposite pair of straight edges, said straight edges being spaced by a distance equal to a width of said indentation;

whereby, said flange is received in said indentation and said guide sleeve is rotated until portions of said flange extend into said notches.

13. The drill bit guiding device as claimed in claim 7, wherein:

said end block has a top surface which is formed with a counterbore at a midsection thereof, said counterbore including a wide upper portion and a narrow lower portion, said end block further having a bottom face and a notch which opens from said bottom face and which is disposed between said through holes of said end block, said lower portion of said counterbore being communicated with said notch; and said drill bit guiding device further including a contact unit which has a screw member and a pedestal member, said screw member having a threaded shank portion and an enlarged head portion, said pedestal member having an upright shaft portion and an enlarged circular base portion, said upright shaft portion extending slidably into said lower portion of said counterbore, said circular base portion having a diameter which corresponds to a width of said notch, said top end of said upright shaft portion being formed with an internally threaded blind hole which engages threadedly said shank portion of said screw member, said head portion of said screw member being received in said upper portion of said counterbore;

whereby, when no upward force is applied on said pedestal member, said pedestal member moves downward so that said circular base portion contacts another side of said workpiece when said drill bit guiding device is mounted on said workpiece.

14. The drill bit guiding device as claimed in claim 7, wherein each of said guide blocks is formed with a pair of parallel horizontal through holes which respectively permit said guide shafts to pass slidably therethrough, and a screw hole that is communicated with a corresponding one of said through holes of said guide block and that is transverse to an axis of said corresponding one of said through holes, said drill bit guiding device further comprising bolts which engage said screw hole of said guide blocks to lock releasably said guide blocks at the desired positions on said guide shafts.

15. The drill bit guiding device as claimed in claim 7, wherein said positioning block is formed with a pair of through holes which respectively permit said second end portions of said guide shafts to pass slidably therethrough, and a screw hole that is communicated with a corresponding one of said through holes of said positioning block and that is transverse to an axis of said corresponding one of said through holes, said drill bit guiding device further comprising a bolt which engages said screw hole to mount releasably said positioning block on said guide shafts.

* * * * *